(12) United States Patent
Kim et al.

(10) Patent No.: US 12,015,908 B2
(45) Date of Patent: Jun. 18, 2024

(54) METHOD AND APPARATUS FOR RECOGNIZING SOUND SOURCE

(71) Applicant: Young Eon Kim, Cupertino, CA (US)

(72) Inventors: Young Eon Kim, Cupertino, CA (US); Min Soo Kim, Cupertino, CA (US)

(73) Assignee: Young Eon Kim, Cupertino, CA (US)

( * ) Notice: Subject to any disclaimer, the term of this patent is extended or adjusted under 35 U.S.C. 154(b) by 331 days.

(21) Appl. No.: 17/424,128

(22) PCT Filed: Nov. 14, 2019

(86) PCT No.: PCT/KR2019/015503
§ 371 (c)(1),
(2) Date: Jul. 19, 2021

(87) PCT Pub. No.: WO2020/159042
PCT Pub. Date: Aug. 6, 2020

(65) Prior Publication Data
US 2022/0132263 A1 Apr. 28, 2022

(30) Foreign Application Priority Data

Jan. 28, 2019 (KR) .......................... 10-2019-0010266

(51) Int. Cl.
*H04S 7/00* (2006.01)
*H04R 3/04* (2006.01)
(Continued)

(52) U.S. Cl.
CPC .............. *H04S 7/302* (2013.01); *H04R 3/04* (2013.01); *H04R 5/027* (2013.01); *H04R 5/04* (2013.01); *H04S 3/002* (2013.01); *H04S 7/307* (2013.01)

(58) Field of Classification Search
CPC .......... H04S 7/302; H04S 3/002; H04S 7/307; H04R 3/04; H04R 5/04; H04R 5/027
(Continued)

(56) References Cited

U.S. PATENT DOCUMENTS

| 1,194,376 A | * | 8/1916 | Furber, Jr. | ................. G01S 1/72 192/93 R |
| 8,947,978 B2 | * | 2/2015 | Mejia | ...................... G01S 3/808 367/124 |

(Continued)

FOREIGN PATENT DOCUMENTS

| CN | 103946715 A | 7/2014 |
| CN | 106772244 A | 5/2017 |

(Continued)

OTHER PUBLICATIONS

International Search Report mailed Feb. 25, 2020, issued to corresponding International Application No. PCT/KR2019/015503.

*Primary Examiner* — Ivian C Chin
*Assistant Examiner* — Con P Tran
(74) *Attorney, Agent, or Firm* — Stein IP, LLC

(57) ABSTRACT

The present invention relates to a method and apparatus for recognizing a sound source. According to the sound source recognition method of the present invention, acoustic signals are detected from four acoustic sensors arranged in a rectangular shape when viewed in a horizontal direction, sound arrival times are measured, six Interactive Time Differences (ITDs) are generated based on differences in sound arrival time between the respective acoustic sensors, and the location of a sound source is estimated based on the six ITDs. In addition, the type of sound source is determined by extracting and classifying features of the sound source by using a sum signal from the four acoustic sensors.

11 Claims, 6 Drawing Sheets

(51) Int. Cl.
*H04R 5/027* (2006.01)
*H04R 5/04* (2006.01)
*H04S 3/00* (2006.01)

(58) Field of Classification Search
USPC ..... 381/300, 92, 122, 91, 56, 58, 71.1, 94.1,
381/86, 365, 71.4; 700/94; 181/125;
901/46, 50; 367/118, 129
See application file for complete search history.

(56) References Cited

U.S. PATENT DOCUMENTS

| | | | |
|---|---|---|---|
| 2014/0211974 A1* | 7/2014 | Pielsticker | H04R 1/086 |
| | | | 381/359 |
| 2014/0362253 A1* | 12/2014 | Kim | H04N 5/262 |
| | | | 367/119 |
| 2016/0134975 A1* | 5/2016 | Kuntzman | H04R 19/005 |
| | | | 381/113 |
| 2019/0259378 A1* | 8/2019 | Khadloya | G06N 20/10 |

FOREIGN PATENT DOCUMENTS

| | | | |
|---|---|---|---|
| JP | H 07-218614 A | | 8/1995 |
| JP | H 11-083975 A | | 3/1999 |
| JP | 2010-236944 A | | 10/2010 |
| JP | 2013-068424 A | | 4/2013 |
| KR | 20090038697 A | * | 4/2009 |
| KR | 10-2011-0041258 A | | 4/2011 |
| KR | 10-1452853 B1 | | 10/2014 |
| KR | 10-1529516 B1 | | 6/2015 |

* cited by examiner

METHOD AND APPARATUS FOR RECOGNIZING SOUND SOURCE

CROSS-REFERENCE TO RELATED APPLICATIONS

This application is a national stage of International Application No. PCT/KR2019/015503, filed Nov. 14, 2019, which claims the benefit of Korean Application No. 10-2019-0010266, filed Jan. 28, 2019, in the Korean Intellectual Property Office, the disclosures of which are incorporated herein by reference.

TECHNICAL FIELD

The present invention relates to a method and apparatus for recognizing a sound source, and more particularly to a method and apparatus for recognizing the sound source of an acoustic signal, generated around an unmanned system such as an autonomous vehicle or a robot, in the unmanned system. In particular, the present invention relates to a technology for recognizing the volume level, direction, moving direction, the location including distance, and type of a sound source, for an acoustic signal generated outside an unmanned system and realizing an auditory function required for the unmanned system in connection with surrounding acoustic situation recognition.

BACKGROUND ART

Conventionally, there is known a technology for recognizing a sound source in order to assist a driver having poor hearing ability when a sound of a horn or siren is generated around a vehicle in driving.

In connection with this, Japanese Patent Publication No. 2015-22453 (published on Feb. 2, 2015) discloses a technology in which four microphones configured to respectively collect sounds around a vehicle in a directional manner and an omnidirectional camera configured to capture images around the vehicle are installed on the top of the vehicle, a siren detection unit configured to perform acoustic signal processing on the output of the microphones, recognize the output as a siren, and detect the location of a sound source and an image processing unit configured to perform image signal processing on the output of the omnidirectional camera, recognize a reflective object capable of reflecting sound, and detect the location are included, and thus the location of an emergency vehicle is determined based on the detection results of the siren detection means and the image processing means.

In addition, Korean Patent Publication No. 10-2018-0045610 (published on May 4, 2018) discloses an acoustic tracking apparatus implemented using three multi-channel microphones configured to collect sounds outside a vehicle. Two of the three microphones are arranged to be spaced apart from each other by a predetermined distance on the left and right sides of the center of the vehicle, and the remaining microphone is arranged to be spaced apart upward from the left one of the two microphones by a predetermined distance. According to this arrangement structure, when a sound is generated on the right side of the upper end of the vehicle, the level of the sound detected by the microphone located at the upper end is higher than the average level of the sound detected by the microphones located on the left and right sides of the lower end, and the level of the sound detected by the microphone located on the right side of the lower end is higher than the level of the sound detected by the microphone located on the left side of the lower end. Using these characteristics, an approximate direction based on the center of the vehicle can be tracked using the levels of the sounds collected from the individual microphones.

Furthermore, an angle with respect to the location at which a sound is generated may be calculated using a difference value (a signal delay) between the arrival times at which the sound arrives at the individual microphones. In this case, the sound tracking unit 140 may store in advance a table in which angles with respect to the locations at which sounds are generated and signal delays corresponding to the respective microphones are mapped to each other, and may calculate an angle with respect to the location at which the sound is generated.

However, the known technologies are still insufficient for application to unmanned systems such as autonomous vehicles because a significant location error occurs, there is a blind spot, and it is difficult to recognize the location of a sound source present in the sky.

DISCLOSURE

Technical Problem

An object of the present invention is to implement an auditory function necessary for recognizing a surrounding acoustic situation in an unmanned system without a driver.

An object of the present invention is to provide a technology capable of recognizing in real time the volume size, direction, moving direction, the location including distance and type of a sound source, without a blind spot in connection with acoustic signals generated in all directions including the sky.

Furthermore, an object of the present invention is to provide a technology capable of recognizing the location of a sound source within a normally tolerable error range even for a sound source located at a long distance.

Furthermore, an object of the present invention is to improve sound source recognition rate using a method, including an initialization method for minimizing an error between channels through automatic trimming that minimizes an output deviation between channels related to respective acoustic sensors.

Furthermore, an object of the present invention is to improve sound source recognition rate by detecting only a signal outside a vehicle purely and to minimize the amount of data to be processed by canceling noise signals such as common random noise present in individual channels.

The technical problems to be solved in the present invention are not limited to the technical problems mentioned above, and other technical problems not mentioned will be clearly understood by those of ordinary skill in the art to which the present invention pertains from the following description below.

Technical Solution

In order to overcome the above-described technical problems, a method for recognizing a sound source according to an aspect of the present invention may include: detecting acoustic signals from at least four acoustic sensors, wherein four of the acoustic sensors are arranged to form the front left, front right, back right, and back left vertices (A, B, C, and D) of a specific rectangle, respectively, when viewed in a horizontal direction, and acoustic signals detected by the four acoustic sensors are referred to as A(s), B(s), C(s), and D(s), respectively; measuring sound arrival times from the respective acoustic signals A(s), B(s), C(s), and D(s); generating six interaural time differences (ITDs) based on a difference in sound arrival time between the front left (A) acoustic sensor and the front right (B) acoustic sensor, a difference in sound arrival time between the front right (B) acoustic sensor and the back right (C) acoustic sensor, a difference in sound arrival time between the back right (C) acoustic sensor and the back left (D) acoustic sensor, a difference in sound arrival time between the back left (D) acoustic sensor and the front left (A) acoustic sensor, a difference in sound arrival time between the front left (A) acoustic sensor and the back right (C) acoustic sensor, and a difference in sound arrival time between the front right (B) acoustic sensor and the back left (D) acoustic sensor; and estimating the location of a sound source based on at least two of the six ITDs.

Furthermore, the method for recognizing a sound source may further include: calculating signals y(s), f(s), b(s), l(s), r(s), cl(s), cr(s), p(s), and q(s) by combining the acoustic signals A(s), B(s), C(s), and D(s) detected by the four acoustic sensors, as follows: y(s)=A(s)+B(s)+C(s)+D(s); f(s)=A(s)+B(s); b(s)=C(s)+D(s); l(s)=A(s)+D(s); r(s)=B(s)+C(s); d(s)=A(s)+C(s); cr(s)=B(s)+D(s); p(s)=f(s)−b(s); and q(s)=l(s)−r(s); and estimating at least one of the volume level, direction, and moving direction of the sound source based on the signals y(s), f(s), b(s), l(s), r(s), d(s), cr(s), p(s), and q(s).

Furthermore, the method for recognizing a sound source may further include determining the type of sound source by extracting a feature of the sound source using the signal y(s), which is the sum signal of the four sound signals, and classifying the extracted feature.

The method for recognizing a sound source may be performed in a vehicle, particularly an autonomous vehicle; and estimating the location of the sound source may include: calculating an azimuth angle $\theta_1$ formed by a line connecting a first pair of acoustic sensors of the four acoustic sensors and the sound source based on an ITD between the first pair of acoustic sensors; calculating an azimuth angle $\theta_2$ formed by a line connecting a second pair of acoustic sensors of the four acoustic sensors and the sound source based on an ITD between the second pair of acoustic sensors, wherein the first pair of acoustic sensors and the second pair of acoustic sensors share one acoustic sensor; and calculating a distance to the sound source using the calculated azimuth angles $\theta_1$ and $\theta_2$, a distance between the first pair of acoustic sensors, and a distance between the second pair of acoustic sensors.

Calculating the distance to the sound source may further include correcting an error by adopting an error correction function in order to correct the error occurring in the calculation of the distance to the sound source.

The method for recognizing a sound source may further include, before detecting the acoustic signals, performing trimming so that the same output signals are output from the four acoustic sensors in a state without an input signal in order to perform initialization.

Furthermore, detecting the acoustic signals may include: canceling voice signals from signals input to the four acoustic sensors; and removing noise signals common to the four acoustic sensors from the signals of the four acoustic sensors from which the voice signals have been canceled, and outputting resulting acoustic signals.

At least one of the four acoustic sensors may be disposed at a height different from that of the other acoustic sensors.

An apparatus for recognizing a sound source according to an aspect of the present invention may include: at least four acoustic sensors configured to detect acoustic signals, wherein four of the acoustic sensors are arranged to form the front left, front right, back right, and back left vertices (A, B, C, and D) of a specific rectangle, respectively, when viewed in a horizontal direction, and acoustic signals detected by the four acoustic sensors are referred to as A(s), B(s), C(s), and D(s), respectively; a sound arrival time measurement unit configured to measure sound arrival times from the respective acoustic signals A(s), B(s), C(s), and D(s); an ITD generation unit configured to generate six interaural time differences (ITDs) based on a difference in sound arrival time between the front left (A) acoustic sensor and the front right (B) acoustic sensor, a difference in sound arrival time between the front right (B) acoustic sensor and the back right (C) acoustic sensor, a difference in sound arrival time between the back right (C) acoustic sensor and the back left (D) acoustic sensor, a difference in sound arrival time between the back left (D) acoustic sensor and the front left (A) acoustic sensor, a difference in sound arrival time between the front left (A) acoustic sensor and the back right (C) acoustic sensor, and a difference in sound arrival time between the front right (B) acoustic sensor and the back left (D) acoustic sensor; and a sound source location estimation unit configured to estimate the location of a sound source based on at least two of the six ITDs.

Advantageous Effects

The present invention configured as described above may generate six ITDs between four acoustic sensors located on the front left, front right, back right, and back left sides of a vehicle by using them, may select at least two of the ITDs, and may recognize a sound source without a blind spot.

At least one of the four acoustic sensors is arranged at a height different from that of the other acoustic sensors, so that the location of a sound source may be recognized even when the sound source is present in the sky.

Furthermore, the present invention may recognize the location of a sound source within a minimal distance error range by using an ITD equation modeled by taking into consideration a shadow effect caused by the front head of a vehicle and an error correction function based on a simulation or the like even when the sound source is located at a long distance.

Moreover, the present invention may improve sound source recognition rate by detecting only a signal outside a vehicle purely, and may minimize the amount of data to be processed by canceling random noise.

MODE FOR INVENTION

Figure 1:
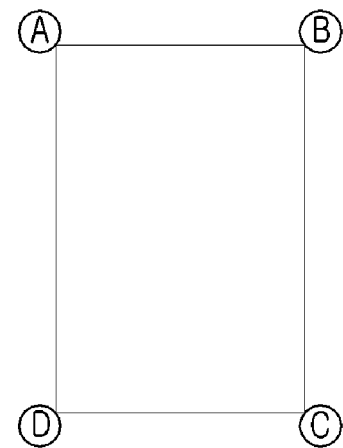
FIG. 1 is a plan view showing the arrangement of acoustic sensors installed in a vehicle according to an embodiment of the present invention.

Embodiments of the present invention will be described in detail below with reference to the accompanying drawings so that those of ordinary skill in the art to which the present invention pertains can easily implement them. The present invention may be embodied in many different forms and is not limited to the embodiments described herein. In order to clearly describe the present invention in the drawings, parts not related to the gist of the present invention are omitted, and the same reference numerals are assigned to the same or similar components throughout the specification.

The present invention will be described based on a method for recognizing a sound source in an autonomous vehicle below, but is not limited thereto. The method for recognizing a sound source according to the present invention may be applied to any apparatus or system requiring the recognition of a sound source, such as a robot or an AI speaker.

FIG. 1 is a plan view showing the arrangement of acoustic sensors installed in a vehicle according to an embodiment of the present invention. The vehicle includes at least four acoustic sensors. Among these acoustic sensors, four acoustic sensors are arranged to form the front left, front right, back right, and back left vertices A, B, C, and D of a specific rectangle, respectively, when viewed in a horizontal direction. For example, the four acoustic sensors, e.g., directional microphones, may be arranged on the front left, front right, back right, and back left sides A, B, C, and D of a vehicle. Accordingly, when viewed in the horizontal direction, i.e., when viewed from the top of the vehicle in a plan view, the four acoustic sensors are arranged diagonally to each other to form the vertices of a specific rectangle, respectively. The specific rectangle may or may not coincide with the overall outline of the vehicle. In other words, the four directional microphones may be arranged inside the outline of the vehicle as long as they form the front left, front right, back right, and back left vertices A, B, C, and D of the specific rectangle when viewed in the horizontal direction. Alternatively, they may be arranged to assume a rectangular or square shape in the front area, central area, or back area of the vehicle.

Although the four acoustic sensors may be disposed at the same height, at least one of the four acoustic sensors may be disposed at a height different from that of the other acoustic sensors in order to completely prevent a blind spot. By disposing at least one of the four acoustic sensors at a different height, it may be possible to generate two or more ITDs in any direction. For example, only one of the four acoustic sensors may be disposed at a height different from that of the other acoustic sensors, two of the acoustic sensors may be disposed at a different height from that of the other acoustic sensors, and all of the four acoustic sensors may be disposed at different heights. In addition, in order to suppress unnecessary signals inside and outside the vehicle, a shield block may be installed around each of the acoustic sensors. For example, unnecessary noise such as wind noise may be blocked by the shield block.

Hereinafter, acoustic signals detected by the four acoustic sensors are referred to as A(s), B(s), C(s), and D(s), respectively.

Figure 2:
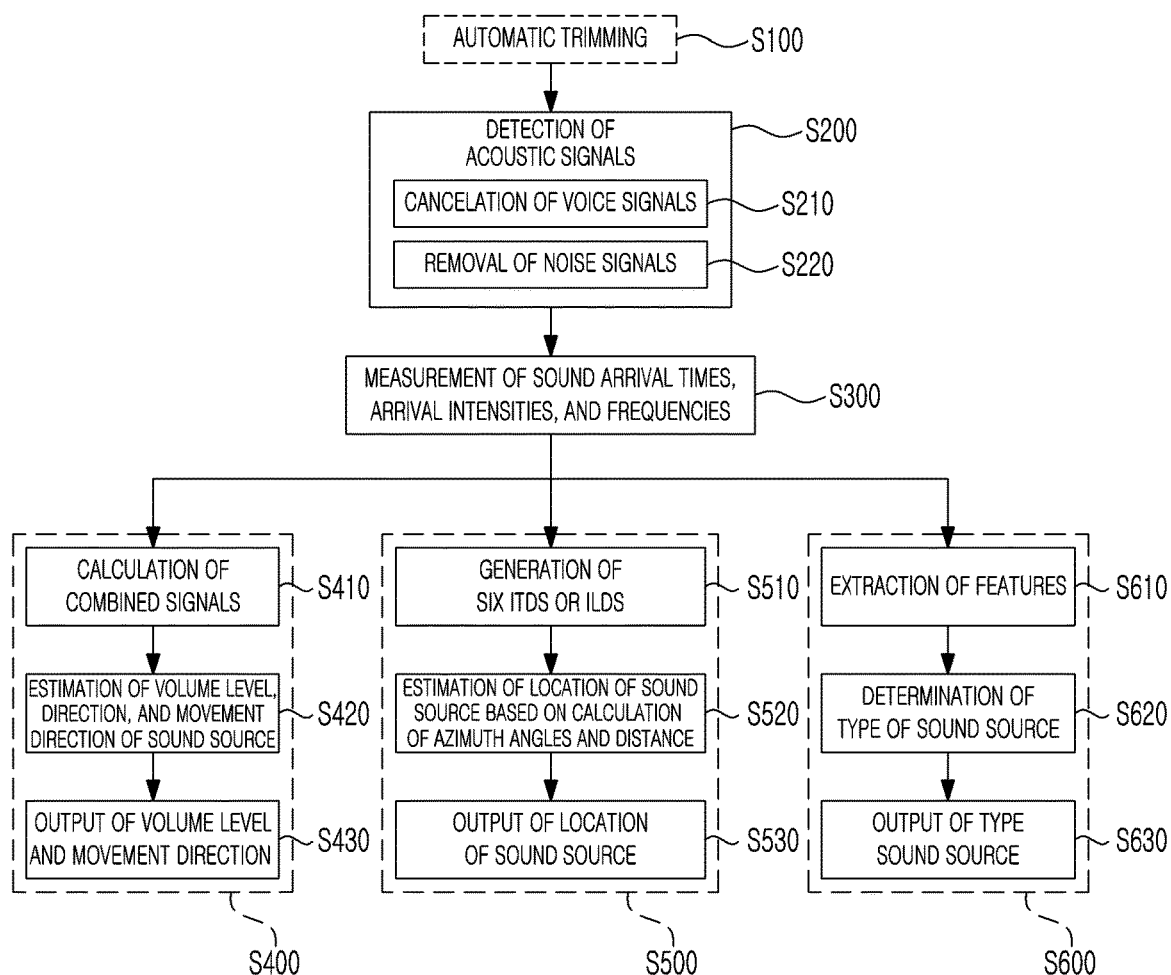
FIG. 2 is a flowchart showing a method for recognizing a sound source according to an embodiment of the present invention.

FIG. 2 is a flowchart showing a method for recognizing a sound source according to an embodiment of the present invention.

The acoustic sensors installed as shown in FIG. 1 detect acoustic signals and output them in real time. In general, the outputs of the acoustic sensors may be different due to the performances of piezoelectric transducers, the characteristics of internal amplifiers, the deviations of passive elements, or/and the like, and thus automatic trimming for initialization is required. At an automatic trimming step S100, the same outputs are output from the four acoustic sensors by trimming the output levels of the remaining acoustic sensors in accordance with the output of the acoustic sensor having the smallest output in a minimum input state with almost no input signal. Accordingly, it may be possible to minimize the differences between individual channels. This automatic trimming step is applied to initialization, and may normally be bypassed.

After the initialization through automatic trimming, the method for recognizing a sound source starts with step S200 of detecting acoustic signals A(s), B(s), C(s), and D(s) using the four acoustic sensors.

Sound sources of interest in connection with an autonomous vehicle are sounds coming from the outside of the vehicle such as the sirens of an ambulance, a fire truck and a traffic control police car, the drone sounds of a drone taxi and a police drone flying in the sky, and the sound of a motorcycle driving around the autonomous vehicle. Accordingly, for the purpose of improving sound source recognition rate, the acoustic signal detection step S200 may include step S210 of canceling voice signals such as human voice or music inside a vehicle from signals input to the acoustic sensors.

Furthermore, the acoustic signal detection step S200 may further include step S220 of removing noise signals such as common random noise included in the channels from the signals of the four acoustic sensors, from which the voice signals have been canceled, through mutual cancellation. As a method for suppressing noise signals at the removal step 220 through mutual cancellation, each filter may be constructed by imparting a reference signal corresponding to a signal to be detected to a band-pass filter that can pass only the signal to be detected therethrough. For example, random noise such as a tire friction sound generated during the driving of a vehicle is not a meaningful signal, so that it is preferable to filter out and attenuate it in advance and then output a desired signal. In this case, noise may be suppressed by using a waveform smoothing method using a moving average or the like. When the noise signals are mutually canceled in this manner, the amount of data to be processed by the apparatus or system that performs the method for recognizing a sound source is reduced. In addition, sound source recognition rate may be improved by detecting only signals having a large weight by the noise signal removing step S220.

Thereafter, there is performed step S300 of measuring at least one of sound arrival time, arrival intensity, and frequency from each of the acoustic signals A(s), B(s), C(s), and D(s). The sound arrival time and the arrival intensity are then used in a sound source location recognition step S500 through the generation of an interaural time difference (ITD) or an interaural level difference (ILD). The frequency may be used to calculate the weight of the ITD or ILD.

Then, a sound source volume level, direction, and moving direction recognition step S400, the sound source location recognition step S500, and a sound source type recognition step S600 may be simultaneously performed in parallel, or may be performed sequentially. When the sound source volume level, direction, and moving direction recognition step S400, the sound source location recognition step S500, and the sound source type recognition step 600 may be simultaneously performed in parallel, there is the effect of shortening recognition time.

First, the sound source volume level, direction, and moving direction recognition step S400 is discussed. There is performed step S410 of calculating signals y(s), f(s), b(s), l(s), r(s), d(s), cr(s), p(s), and q(s) by combining the acoustic signals A(s), B(s), C(s), and D(s) detected by the four acoustic sensors.

y(s) is the sum signal of the four acoustic signals, and is calculated as follows:

$$y(s)=A(s)+B(s)+C(s)+D(s) \quad \text{[Equation 1]}$$

f(s) represents a front signal, b(s) represents a back signal, and they are calculated as follows, respectively:

$$f(s)=A(s)+B(s) \quad \text{[Equation 2]}$$

$$b(s)=C(s)+D(s) \quad \text{[Equation 3]}$$

l(s) represents a left signal, r(s) represents a right signal, and they are calculated as follows, respectively:

$$l(s)=A(s)+D(s) \quad \text{[Equation 4]}$$

$$r(s)=B(s)+C(s) \quad \text{[Equation 5]}$$

cl(s) represents a left cross signal, cr(s) represents a right cross signal, and they are calculated as follows, respectively:

$$cl(s)=A(s)+C(s) \quad \text{[Equation 6]}$$

$$cr(s)=B(s)+D(s) \quad \text{[Equation 7]}$$

p(s) represents the signal difference between the front and back signals, q(s) represents the signal difference between the left and right signals, and they are calculated as follows, respectively:

$$p(s)=f(s)-b(s) \quad \text{[Equation 8]}$$

$$q(s)=l(s)-r(s) \quad \text{[Equation 9]}$$

Then, there is performed step S420 of estimating the volume level, direction, and moving direction of the sound source based on the signals y(s), f(s), b(s), l(s), r(s), cl(s), cr(s), p(s), and q(s). In other words, the direction in which the sound source is generated, i.e., a forward, backward, leftward, or rightward direction, may be recognized by performing comparative analysis on the signals. For example, when f(s) is higher than b(s), it may be recognized that there is the sound source on the front side. In contrast, when l(s) is higher than r(s), it may be recognized that there is the sound source on the left side. In addition, the volume level of the sound source for each channel and the sum volume level of the sound source may be recognized by performing comparative analysis on the signals. In this case, the value of the signal y(s) is regarded as the volume level.

Furthermore, the value of the signal y(s) at a specific point in time and the value of the signal y(s) at a subsequent point in time may be compared with each other. In this case, it can be seen that when the value increases, the moving direction of the sound source is a direction toward to the autonomous vehicle, and it can also be seen that when the value decreases, the moving direction of the sound source is a direction away from the autonomous vehicle. In addition, not only the direction in which the sound source is generated but also the direction in which it moves may be determined by performing comparative calculation on the signals f(s), b(s), l(s) r(s), cl(s), cr(s), p(s), and q(s) according to [Equation 2] to [Equation 9]. For example, when the signal f(s) is lower than b(s), gradually becomes equal to b(s), and further becomes higher than b(s), it can be seen that the sound source moves from the back to the front.

According to an embodiment of the present invention, the volume level of the sound source may be recognized by the signal y(s), which is the sum signal of the four acoustic signals, regardless of the direction.

The volume level, direction, and moving direction of the sound source are output to a host, which is the system host of the apparatus for recognizing a sound source, at step S430.

Now, there will be described step S500 of recognizing the location of the sound source.

In this case, the location of the sound source means the location of the sound source based on the azimuth angle and distance of the sound source.

To recognize the location of the sound source, first, there is performed step S510 of generating six ITDs or ILDs based on a difference in sound arrival time or sound arrival intensity between the front left (A) acoustic sensor and the front right (B) acoustic sensor, a difference in sound arrival time or sound arrival intensity between the front right (B) acoustic sensor and the back right (C) acoustic sensor, a difference in sound arrival time or sound arrival intensity between the back right (C) acoustic sensor and back left (D) acoustic sensor, a difference in sound arrival time or sound arrival intensity between the back left (D) acoustic sensor and the front left (A) acoustic sensor, a difference in sound arrival time or sound arrival intensity between the front left (A) acoustic sensor and the back right (C) acoustic sensor, and a difference in sound arrival time or sound arrival intensity between the front right (B) acoustic sensor and the back left (D) acoustic sensor.

Next, there is performed step S520 of estimating the location of the sound source based on at least two of the generated six ITDs or ILDs. A method for estimating the location of a sound source based on ITDs according to an embodiment of the present invention will be described below.

When an ITD is generated based on a difference in sound arrival time from an acoustic signal, an azimuth angle θ formed by a line connecting the sound source and a center between two acoustic sensors and a horizontal line connecting the two acoustic sensors can be obtained from a distance R between two of the four acoustic sensors and the speed c (about 340 m/s) of sound traveling in the air, as follows:

$$\theta = \cos^{-1}\frac{ITD*c}{R} \quad \text{[Equation 10]}$$

The remaining azimuth angles can also be calculated in the same manner.

Figure 3:
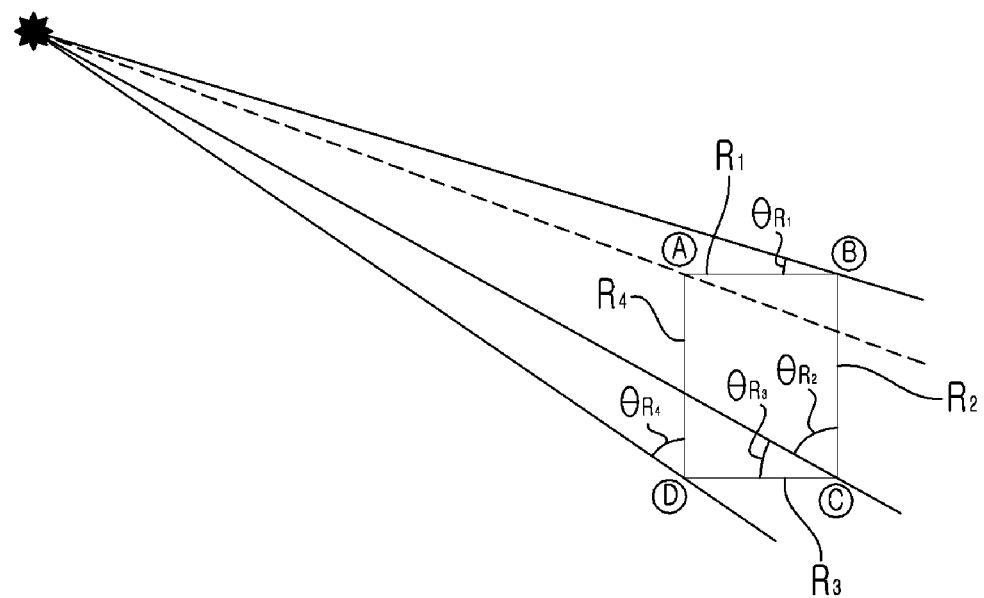
FIGS. 3 and 4 are diagrams illustrating the azimuth angle of a sound source according to an embodiment of the present invention.
Figure 4:
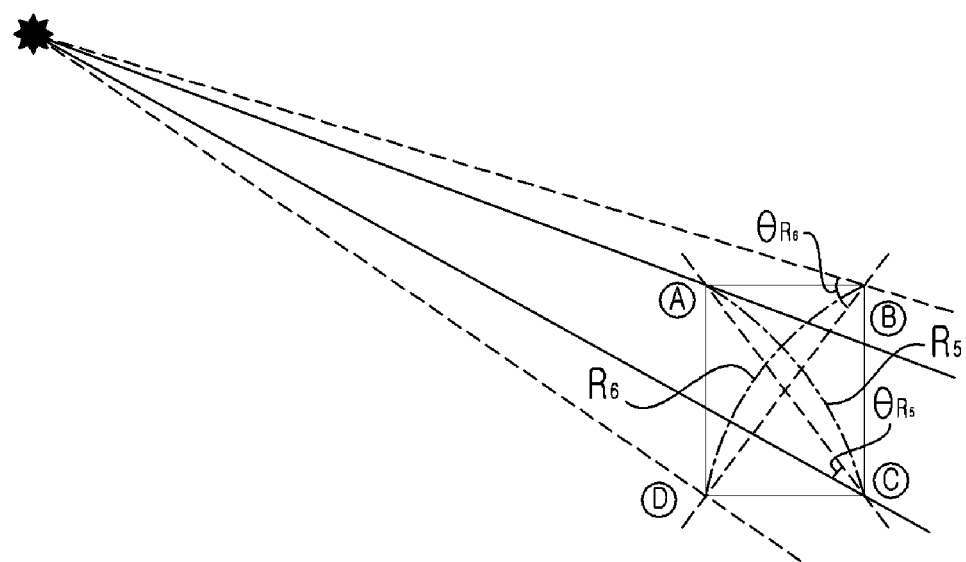

FIGS. 3 and 4 are diagrams illustrating the azimuth angle of a sound source according to an embodiment of the present invention.

Meanwhile, since it is assumed that the sound source is spaced apart by an infinite distance, i.e., it is assumed that a sound arrives in parallel from the sound source to both acoustic sensors, the angle formed by a line connecting the sound source and a center between the two acoustic sensors and a horizontal line connecting the two acoustic sensors is considered to be the same as the angle formed by a line connecting the sound source and each of the two acoustic sensors and the horizontal line connecting the two acoustic sensors. Accordingly, in FIGS. 3 and 4, in order to derive the following [Equation 11], [Equation 12], and [Equation 13], the angle formed by a line connecting the sound source and one of the two acoustic sensors disposed farther away from the sound source and the horizontal line connecting the two acoustic sensors is denoted by an azimuth angle.

Referring to FIG. 3, the azimuth angle among the front left (A) acoustic sensor, the front right (B) acoustic sensor, and the sound source is denoted by $\theta_{R1}$, the azimuth angle among the front right (B) acoustic sensor, the back right (C) acoustic sensor, and the sound source is denoted by $\theta_{R2}$, the azimuth angle among the back right (C) acoustic sensor, the back left (D) acoustic sensor, and the sound source is denoted by $\theta_{R3}$, and the azimuth angle among the back left (D) acoustic sensor, the front left (A) acoustic sensor, and the sound source is denoted by $\theta_{R4}$.

Referring to FIG. 4, the azimuth angle among the front left (A) acoustic sensor, the back right (C) acoustic sensor, and the sound source is denoted by $\theta_{R5}$, and the azimuth angle among the front right (B) acoustic sensor, the back left (D) acoustic sensor, and the sound source is denoted by $\theta_{R6}$.

In addition, when the values of the two azimuth angles $\theta$ are obtained in the same dimension, the location of the sound source may be estimated by calculation. In other words, two azimuth angles $\theta$ among the sound source and the acoustic sensors may be obtained from two ITDs generated from the arrival times of signals detected by three of the four acoustic sensors and the size of the structure of a given autonomous vehicle, and the distance to the sound source may be calculated using the values of the azimuth angles $\theta$. In the case where one of the three acoustic sensors generating two ITDs is not located on the same plane but at a different height, e may be obtained by substitution with the same plane through a simulation using trigonometry.

Figure 5:
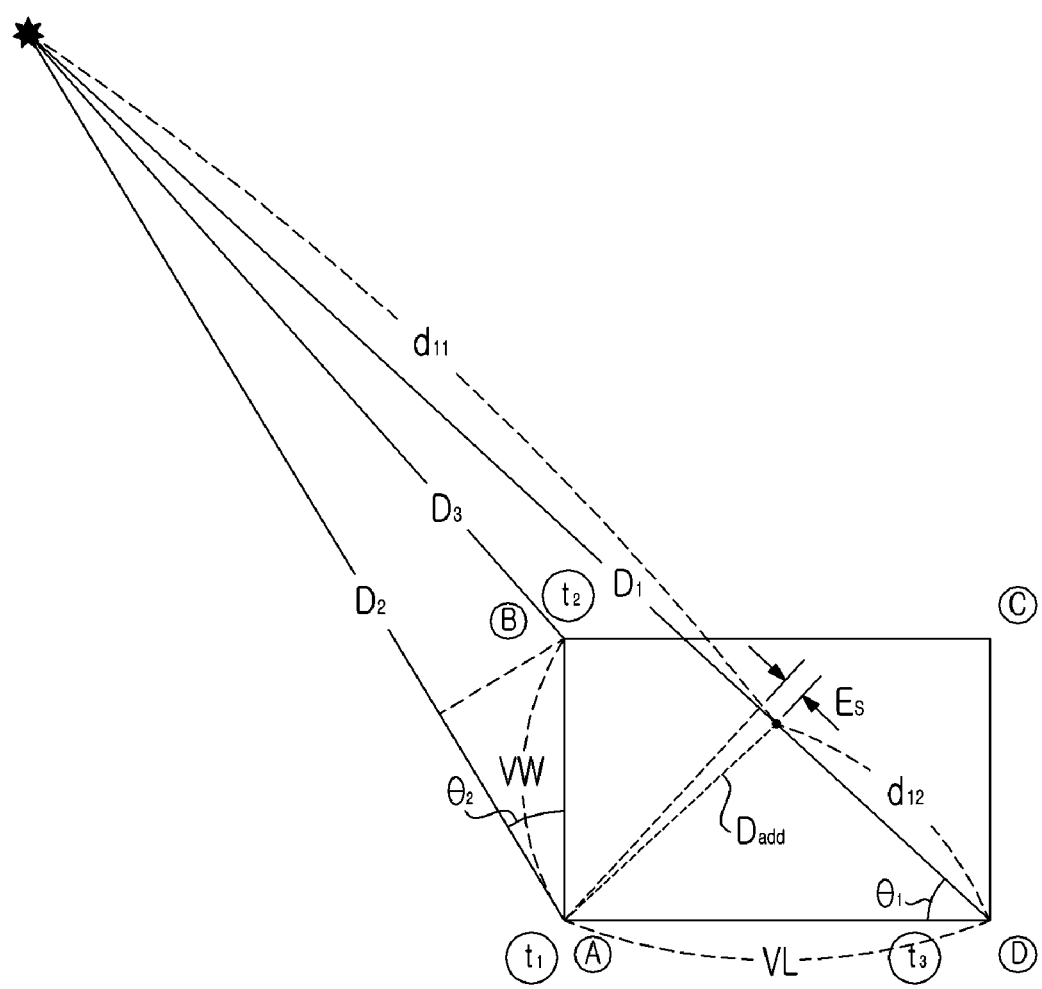
FIG. 5 is a diagram illustrating a method of obtaining a distance between a sound source and an acoustic sensor according to an embodiment of the present invention.

More specifically, assuming that acoustic sensors are arranged at respective corners of a vehicle, the distance from the vehicle having a width VW and a length VL to the sound source may be calculated by applying the above-described ITDs. A method of obtaining the distance $D_1$ between the sound source and the back left (D) acoustic sensor will be described below with reference to FIG. 5.

$D_1$ is the estimated distance between the sound source and the back left (D) acoustic sensor, and $D_2$ ($=d_{11}$) is the estimated distance between the sound source and the front left (A) acoustic sensor. $d_{12}$ is the distance over which an acoustic signal travels further to reach the back left (D) acoustic sensor from the location at which it arrives at the front left (A) acoustic sensor. Accordingly, $D_1$ can be obtained as the sum of $d_{11}$ and $d_{12}$.

A method of obtaining $\theta_1$ and $\theta_2$ necessary to obtain $d_{11}$ is obtained based on the times at which the acoustic signal arrives at the front left (A) acoustic sensor, the front right (B) acoustic sensor, and the back left (D) acoustic sensor and the distance between the acoustic sensors, as in the following [Equation 13] and [Equation 14]. In this case, since it is assumed that the acoustic sensors are arranged at respective corners of the vehicle, the distance between the front left (A) acoustic sensor and the front right (B) acoustic sensor corresponds to the width VW of the vehicle, and the distance between the front left (A) acoustic sensor and the back left (D) acoustic sensor corresponds to the length VL of the vehicle. When not all acoustic sensors are arranged at the corners of the vehicle, the intervals between the acoustic sensors are used. $t_1$ is the time when the acoustic signal generated from the sound source arrives at the front left (A) acoustic sensor, and $t_2$ and $t_3$ are the times when the acoustic signal arrives at the front right (B) acoustic sensor and the back left (D) acoustic sensor. The equations below are merely examples. When a mathematical modeling method is different, they may be expressed in different forms.

$$D_1 = d_{11} + d_{12} = \frac{VL * \sin\theta_1 * \cos(90 - \theta_2 - \theta_1)}{\cos(90 - \theta_2 - \theta_1)} + (t_3 - t_1) * c \quad \text{[Equation 11]}$$

$$d_{12} = (t_3 - t_1) * c \quad \text{[Equation 12]}$$

$$\theta_1 = \cos^{-1}\frac{(t_3 - t_1) * c}{VL} \quad \text{[Equation 13]}$$

$$\theta_2 = \cos^{-1}\frac{(t_1 - t_2) * c}{VW} \quad \text{[Equation 14]}$$

The distance between the sound source and the back left (D) acoustic sensor can be obtained using the above-described method, and the distance between the sound source and the front left (A) acoustic sensor and the distance between the sound source and the back right (C) acoustic sensor based on the front right (B) acoustic sensor can also be calculated using the same method.

The distances between the sound source and the acoustic sensors may be obtained as described above. However, in practice, the sound source is not located at infinity, and thus a distance obtained by the above method contains an error. In other words, although a basic model assumes that a sound source is located at infinity and considers that a line denoted by $D_1$ and a line denoted by $D_{add}$ in FIG. 5 form right angles, a distance error $E_S$ occurs because they are not perpendicular to each other in practice. Accordingly, it is desirable to correct such an error. For error correction, $\theta_1$ and $\theta_2$ are corrected as follows:

$$\theta'_1 = \cos^{-1}\frac{(t_3 - t_1) * c + VL * C_{E_D}}{VL} \quad \text{[Equation 15]}$$

$$\theta'_2 = \cos^{-1}\frac{(t_1 - t_2) * c + VW * C_{E_A}}{VW} \quad \text{[Equation 16]}$$

$$D'_1 = d_{11} + d_{12} = \frac{VL * \sin\theta_1 * \cos(90 - \theta_2 - \theta_1)}{\cos(90 - \theta_2 - \theta_1)} + (t_3 - t_1) * c \quad \text{[Equation 17]}$$

Alternatively, the error may be corrected as in [Equation 18] below:

$$D''_1 = d_{11} + d_{12} = \quad \text{[Equation 18]}$$
$$\left[\frac{VL * \sin\theta_1 * \cos(90 - \theta_2 - \theta_1)}{\sin(90 - \theta_2 - \theta_1)} + (t_3 - t_1) * c\right] * \frac{1}{C_{E_S}}$$

In this case, $C_{EA}$, $C_{ED}$, and $C_{ES}$ are nonlinear error correction functions, and may be determined by a real distance-calculated distance comparison simulation or other calculations.

Since all the four acoustic sensors are located at different locations, the arrival times of a sound entering the respective acoustic sensors are also different. In other words, ITDs are obtained using the time differences that occur when a sound arrive at the individual acoustic sensors from a sound source at asymmetric distances, azimuth angles $\theta$ are obtained, and then the distance to the sound source is calculated by utilizing given distances between the acoustic sensors, thereby recognizing the location at which the sound has been generated. In addition, according to the present invention, $ITD_{R5}$ between the front left (A) acoustic sensor and the back right (C) acoustic sensor located diagonally to each other, and $ITD_{R6}$ between the front right (B) acoustic sensor and the back left (D) acoustic sensor may be generated. Accordingly, even when the sound source is placed at the location at which the values of $ITD_{R1}$ to $ITD_{R4}$ become 0, it may be possible to recognize the location of the sound source without a blind spot by generating two or more ITDs.

In addition, when acoustic sensors are disposed at different heights, azimuth angles θ may be obtained by substitution with the same plane through a simulation using trigonometry, and the distance to a sound source may be calculated based on the azimuth angles, thereby recognizing the location of the sound source.

The location of the sound source estimated as described above is output to the host at step S530.

Now, there will be described step S600 of recognizing the type of sound source. Step S600 of recognizing the type of sound source starts with step S610 of extracting the feature(s) of a sound source using the signal y(s), which is the sum signal of the four acoustic signals. The feature(s) may be extracted using a sound spectrogram technique, or may be extracted using another acoustic signal feature extraction method, e.g., Mel Frequency Cepstrum Coefficient (MFCC). Then, there is performed step S620 of determining the type of sound source by classifying the extracted feature(s). At this determination step, the type of sound source may be determined by a method of classifying the feature(s) using artificial intelligence such as DNNs (Deep Neural Networks) and recognizing a target sound among overlapping sounds using a tensor flow backend method or other scoring method (e.g., a weighting or labeling method of allocating a weight having a value between set minimum and maximum values and then performing calculation). A learning method or a non-learning method may be used to classify the sound source. It may be possible to determine whether the sound source is, e.g., a siren sound, a drone sound, or a motorcycle sound by the sound source type determination step S620.

The type of sound source determined in the above manner is output to the host at step S630.

Although the sound source volume level, direction and moving direction recognition step S400, the sound source location recognition step S500, and the sound source type recognition step S600 have been described as being performed in parallel in this embodiment, they may be performed sequentially. The sequence of the steps illustrated in FIG. 2 is merely an example, and the present invention is not limited thereto.

Figure 6:
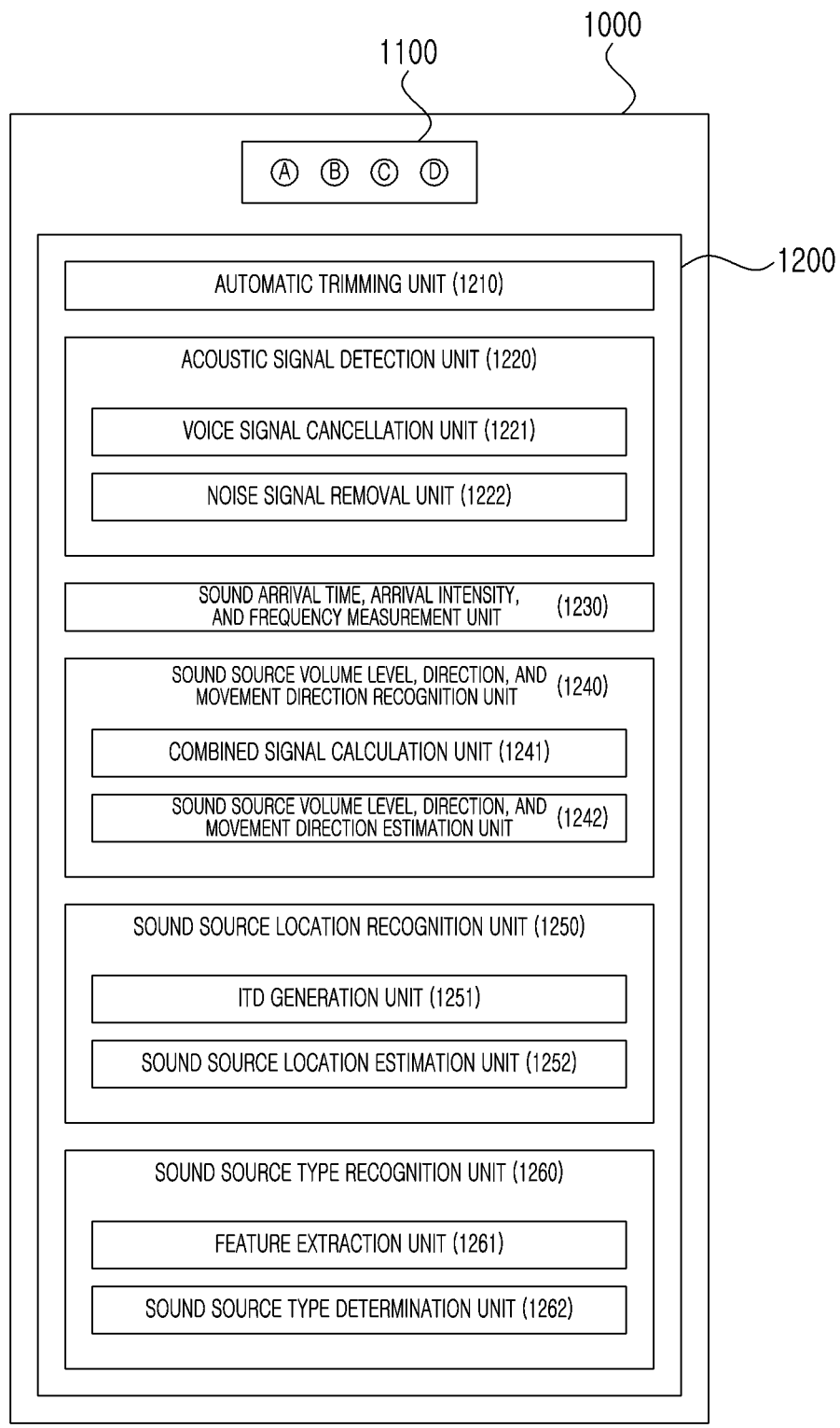
FIG. 6 is a schematic diagram of an apparatus for recognizing a sound source according to an embodiment of the present invention.

FIG. 6 is a schematic diagram of an apparatus for recognizing a sound source according to an embodiment of the present invention. An apparatus 1000 for recognizing a sound source according to an embodiment of the present invention includes a sound detection unit 1100 and a processing module 1200. The sound detection unit 1100 includes four acoustic sensors for detecting acoustic signals. The four acoustic sensors are arranged such that when viewed in a horizontal direction, the four acoustic sensors form the front left (A), front right (B), back right (C), and back left (D) vertices of a specific rectangle, respectively. In this case, the acoustic signals detected by the four acoustic sensors are referred to as A(s), B(s), C(s), and D(s), respectively.

The processing module 1200 includes components capable of performing the steps described above in conjunction with FIG. 2. For example, the processing module 1200 may include an automatic trimming unit 1210, an acoustic signal detection unit 1220, a sound arrival time, arrival intensity, and frequency measurement unit 1230 configured to measure sound arrival time, arrival intensity, and frequency from each of the acoustic signals A(s), B(s), C(s), and D(s), a sound source volume level, direction, and moving direction recognition unit 1240 configured to recognize the volume level, direction, and moving direction of a sound source based on signals y(s), f(s), b(s), l(s), r(s), cl(s), cr(s), p(s), and q(s), which are the combined signals of four acoustic signals, a sound source location recognition unit 1250, and a sound source type recognition unit 1260. The acoustic signal detection unit 1220 may include a voice signal cancellation unit 1221, and a noise signal removal unit 1222. The sound source volume level, direction, and moving direction recognition unit 1240 may include a combined signal calculation unit 1241, and a sound source volume level, direction, and moving direction estimation unit 1242. In addition, the sound source location recognition unit 1250 may include an ITD generation unit 1251 configured to generate six interaural time differences (ITDs) based on a difference in sound arrival time between the front left (A) acoustic sensor and the front right (B) acoustic sensor, a difference in sound arrival time between the front right (B) acoustic sensor and the back right (C) acoustic sensor, a difference in sound arrival time between the back right (C) acoustic sensor and the back left (D) acoustic sensor, a difference in sound arrival time between the back left (D) acoustic sensor and the front left (A) acoustic sensor, a difference in sound arrival time between the front left (A) acoustic sensor and the back right (C) acoustic sensor, and a difference in sound arrival time between the front right (B) acoustic sensor and the back left (D) acoustic sensor, and a sound source location estimation unit 1252 configured to estimate the location of the sound source based on at least two of the six ITDs. The sound source location estimation unit 1252 may calculate an azimuth angle $\theta_1$ formed by a line connecting a first pair of acoustic sensors of the four acoustic sensors and the sound source based on the ITD between the first pair of acoustic sensors, may calculate an azimuth angle $\theta_2$ formed by a line connecting a second pair of acoustic sensors of the four acoustic sensors and the sound source based on the ITD between the second pair of acoustic sensors, and may calculate the distance to the sound source using the calculated azimuth angles $\theta_1$ and $\theta_2$, the distance between the first pair of acoustic sensors, and the distance between the second pair of acoustic sensors. The sound source location estimation unit 1252 may correct the error by adopting an error correction function in order to correct an error occurring in the calculation of the distance to the sound source. Furthermore, the sound source type recognition unit 1260 may include a feature extraction unit 1261, and a sound source type determination unit 1262.

Although the individual components of the processing module 1200 have been described as separate components, all the components may be combined and function as a single component, or only some components may be combined and function as a single component. However, as long as the above configurations perform the above-described functions, all the configurations fall within the scope of the present invention.

Since the above embodiments are only the most basic examples of the present invention, it should not be understood that the present invention is limited to the above embodiments, but it should be understood that the scope of the present invention must be defined based on the attached claims and equivalents thereto.

The invention claimed is:

1. A method for recognizing a sound source, the method comprising:
  detecting acoustic signals using at least four acoustic sensors, each of the acoustic sensors detecting the acoustic signals from air, wherein four of the acoustic sensors are arranged at vertices A, B, C, and D of a specific rectangle in a plan view, respectively, and acoustic signals detected by the four acoustic sensors are referred to as A(s), B(s), C(s), and D(s), respectively;
calculating sound arrival times from the respective acoustic signals A(s), B(s), C(s), and D(s);
generating six interaural time differences (ITDs) based on a difference in sound arrival time between the acoustic sensor at vertex A and the acoustic sensor at vertex B, between the acoustic sensor at vertex B and the acoustic sensor at vertex C, between the acoustic sensor at vertex C and the acoustic sensor at vertex D, between the acoustic sensor at vertex D and the acoustic sensor at vertex A, between the acoustic sensor at vertex A and the acoustic sensor at vertex C, and between the acoustic sensor at vertex B and the acoustic sensor at vertex D; and
estimating a location of a sound source based on at least two of the six ITDs,
wherein estimating the location of the sound source comprises:
calculating an azimuth angle $\theta_1$ formed by a line connecting a first pair of acoustic sensors at the vertices A and D of the four acoustic sensors and a line connecting the sound source and the acoustic sensor at the vertex D based on an ITD between the first pair of acoustic sensors at the vertices A and D;
calculating an azimuth angle $\theta_2$ formed by a line connecting a second pair of acoustic sensors at the vertices B and A of the four acoustic sensors and a line connecting the sound source and the acoustic sensor at the vertex A based on an ITD between the second pair of acoustic sensors at the vertices B and A, wherein the first pair of acoustic sensors at the vertices A and D and the second pair of acoustic sensors at the vertices B and A share the acoustic sensor at the vertex A; and
calculating a distance to the sound source using the calculated azimuth angles $\theta_1$ and $\theta_2$, a distance VL between the first pair of acoustic sensors at the vertices A and D, and a distance VW between the second pair of acoustic sensors at the vertices B and A.

2. The method of claim 1, further comprising:
calculating at least one of signals y(s), f(s), b(s), I(s), r(s), cl(s), cr(s), p(s), or q(s) by combining the acoustic signals A(s), B(s), C(s), or D(s) detected by the four acoustic sensors, as follows:

$$y(s)=A(s)+B(s)+C(s)+D(s);$$

$$f(s)=A(s)+B(s);$$

$$b(s)=C(s)+D(s);$$

$$l(s)=A(s)+D(s);$$

$$r(s)=B(s)+C(s);$$

$$cl(s)=A(s)+C(s);$$

$$cr(s)=B(s)+D(s);$$

$$p(s)=f(s)-b(s); \text{ and}$$

$$q(s)=l(s)-r(s),$$

estimating at least one of a volume level, direction, and moving direction of the sound source based on the signals y(s), f(s), b(s), I(s), r(s), cl(s), cr(s), p(s), or q(s).

3. The method of claim 1, further comprising determining a type of sound source by extracting a feature of the sound source using a signal y(s), which is a sum signal of the four sound signals, and classifying the extracted feature.

4. The method of claim 1, wherein calculating the distance to the sound source further comprises correcting an error by adopting an error correction function in order to correct the error occurring in the calculation of the distance to the sound source.

5. The method of claim 1, further comprising, before detecting the acoustic signals, performing trimming so that same output signals are output from the four acoustic sensors in a state without an input signal in order to perform initialization.

6. The method of claim 1, wherein detecting the acoustic signals comprises:
canceling voice signals from signals input to the four acoustic sensors.

7. The method of claim 6, wherein detecting the acoustic signals comprises:
removing noise signals common to the four acoustic sensors from the signals of the four acoustic sensors from which the voice signals have been canceled, and outputting resulting acoustic signals.

8. The method of claim 1, wherein at least one of the four acoustic sensors is disposed at a height different from that of remaining acoustic sensors.

9. The method of claim 1, wherein the acoustic sensors comprise noise shielding acoustic sensors around each of which a shield block is installed to suppress unnecessary signals.

10. An apparatus for recognizing a sound source, the apparatus comprising:
at least four acoustic sensors configured to detect acoustic signals, each of the acoustic sensors detecting the acoustic signals from air, wherein four of the acoustic sensors are arranged at vertices A, B, C, and D of a specific rectangle in a plan view, respectively, and acoustic signals detected by the four acoustic sensors are referred to as A(s), B(s), C(s), and D(s), respectively;
a sound arrival time measurement unit configured to calculate sound arrival times from the respective acoustic signals A(s), B(s), C(s), and D(s);
an ITD generation unit configured to generate six interaural time differences (ITDs) based on a difference in sound arrival time between the acoustic sensor at vertex A and the acoustic sensor at vertex B, between the acoustic sensor at vertex B and the acoustic sensor at vertex C, between the acoustic sensor at vertex C and the acoustic sensor at vertex D, between the acoustic sensor at vertex D and the acoustic sensor at vertex A, between the acoustic sensor at vertex A and the acoustic sensor at vertex C, and between the acoustic sensor at vertex B and the acoustic sensor at vertex D; and
a sound source location estimation unit configured to estimate a location of a sound source based on at least two of the six ITDs,
wherein estimating the location of the sound source comprises:
calculating an azimuth angle $\theta_1$ formed by a line connecting a first pair of acoustic sensors at the vertices A and D of the four acoustic sensors and a line connecting the sound source and the acoustic sensor at the vertex D based on an ITD between the first pair of acoustic sensors at the vertices A and D;
calculating an azimuth angle $\theta_2$ formed by a line connecting a second pair of acoustic sensors at the vertices B and A of the four acoustic sensors and a line connecting the sound source and the acoustic sensor at the vertex A based on an ITD between the second pair of acoustic sensors at the vertices B and A, wherein the first pair of acoustic sensors at the vertices A and D and the second pair of acoustic sensors at the vertices B and A share the acoustic sensor at the vertex A; and calculating a distance to the sound source using the calculated azimuth angles $\theta_1$ and $\theta_2$, a distance VL between the first pair of acoustic sensors at the vertices A and D, and a distance VW between the second pair of acoustic sensors at the vertices B and A.

11. A non-transitory computer-readable medium storing codes for causing a computer to perform the method of claim 1.

* * * * *